US012602207B1

(12) United States Patent
Segal et al.

(10) Patent No.: US 12,602,207 B1
(45) Date of Patent: Apr. 14, 2026

(54) METHOD AND SYSTEM FOR CLASSIFYING CONTENT OF WEB PAGES USING MACHINE LEARNING TECHNIQUES

(71) Applicant: Moonshot AI Inc, New York, NY (US)

(72) Inventors: Evyatar Segal, Hoboken, NJ (US); Yehuda Alexander Krupka, New York, NY (US)

(73) Assignee: Moonshot AI Inc, New York, NY (US)

( * ) Notice: Subject to any disclaimer, the term of this patent is extended or adjusted under 35 U.S.C. 154(b) by 0 days.

(21) Appl. No.: 19/206,781

(22) Filed: May 13, 2025

(51) Int. Cl.
| | |
|---|---|
| *G06F 9/44* | (2018.01) |
| *G06F 8/30* | (2018.01) |
| *G06F 9/445* | (2018.01) |
| *G06F 9/45* | (2006.01) |
| *G06F 9/455* | (2018.01) |

(52) U.S. Cl.
CPC ..................................... *G06F 8/30* (2013.01)

(58) Field of Classification Search
CPC ........................................................ G06F 8/30
See application file for complete search history.

(56) References Cited

U.S. PATENT DOCUMENTS

| | | | |
|---|---|---|---|
| 10,650,073 B1 | 5/2020 | Manzi et al. | |
| 12,321,414 B1 * | 6/2025 | Frenkel ................. | G06F 16/958 |
| 12,340,557 B1 * | 6/2025 | Saraee ................. | G06F 16/438 |
| 2021/0406337 A1 * | 12/2021 | Frikha ................... | G06F 18/214 |
| 2022/0012268 A1 * | 1/2022 | Ghoshal ................ | G06F 16/906 |
| 2023/0018387 A1 * | 1/2023 | Kuksta ................... | G06F 16/954 |
| 2024/0419772 A1 * | 12/2024 | Young, Jr. ............... | G06F 21/36 |
| 2024/0419907 A1 * | 12/2024 | Laprise ................... | G01C 21/34 |
| 2025/0036871 A1 * | 1/2025 | Rivain ................... | G06F 40/274 |
| 2025/0156898 A1 * | 5/2025 | Crabtree ............ | G06Q 30/0277 |
| 2025/0190460 A1 * | 6/2025 | Madisetti ............ | G06F 16/3329 |
| 2025/0200118 A1 * | 6/2025 | Flores ................... | G06F 16/951 |

FOREIGN PATENT DOCUMENTS

| | | | | | |
|---|---|---|---|---|---|
| CN | 118260464 | A | * | 6/2024 | ............... G06N 3/08 |
| CN | 119249020 | A | * | 1/2025 | ........... G06F 16/954 |
| EP | 4187407 | A1 | * | 5/2023 | ............... G06N 5/04 |

OTHER PUBLICATIONS

English translation, Mueller et al. (EP 4187407 A1), 2023, pp. 1-22. (Year: 2023).*
English translation, Zhou et al. (CN 119249020 A), 2025, pp. 1-17. (Year: 2025).*
Insaf Kraidia, A Multi-Faceted Approach to Trending Topic Attack Detection Using Semantic Similarity and Large-Scale Datasets, Jan. 2025, pp. 1-24. https://ieeexplore.ieee.org/stamp/stamp.jsp?arnumber= 10857330 (Year: 2025).*

* cited by examiner

*Primary Examiner* — Mongbao Nguyen
(74) *Attorney, Agent, or Firm* — M&B IP Analysts, LLC

(57) ABSTRACT

A system and method for optimizing web content is presented. The method includes receiving contents of a web page, wherein the contents include at least a plurality of elements, each element including a markup language code; detecting at least one relevant element from the contents based on a predefined list of element types; extracting attributes from each element into an element feature vector; classifying each element based on the element feature vector of extracted attributes; and identifying at least one candidate element for web content optimization based on an element classification and the element feature vector.

23 Claims, 5 Drawing Sheets

S310

Receive contents of a web page

S320

Detect relevant elements of the contents of the web page

S330

Extract attributes of the relevant elements into feature vectors

S340

Classify each element based on the feature vector of extracted attributes

S350

Modify the contents of the web page based on the classification of the elements of the webpage and the feature vector

S410

Detect collections of elements

S420

Extract attributes of the collections into feature vectors

S430

Classify each collection based on the feature vector of extracted attributes

S440

Modify the contents of the web page based on the classification of the collections of the webpage and the feature vector

METHOD AND SYSTEM FOR CLASSIFYING CONTENT OF WEB PAGES USING MACHINE LEARNING TECHNIQUES

CROSS-REFERENCE TO RELATED APPLICATIONS

The subject matter of this application is related to U.S. patent application Ser. No. 18/930,617, filed on Oct. 29, 2024, the entire disclosure of which is hereby incorporated by reference in its entirety.

TECHNICAL FIELD

The present disclosure relates generally to web content provisioning, and specifically to machine learning-based methods and systems for web content provisioning.

BACKGROUND

Artificial intelligence is increasingly used to analyze web pages and content platforms to enhance performance, particularly in areas such as user engagement, conversion rates, and content personalization. Typical solutions involve parsing the structure and content of a web page and evaluating how users interact with elements in web page. Machine learning (ML) models are often employed to identify patterns in user behavior, such as which parts of a page users tend to ignore, where they linger, and what paths they follow through a site.

Typically, these ML models are trained on large datasets comprising user interaction logs, clickstream data, heatmaps, and other telemetry. With this data, they aim to identify which design choices are correlated with higher engagement or conversion, then recommend or even automate modifications to replicate those successful patterns across other pages or user segments. The ultimate goal is to make web experiences more intuitive, responsive, and tailored to individual user preferences, ideally resulting in more time spent on site, higher retention, and more transactions or sign-ups.

However, there are significant challenges in achieving these goals. One persistent issue lies in the ML models' inability to accurately classify the individual elements on a web page. Web pages can be incredibly diverse in design and implementation, with overlapping layers of styling, scripting, and content structures. Even subtle variations in code or layout can confuse classifiers, especially when such classifiers trained on limited or overly-specific datasets. For instance, what one site implements as a navigation bar might be coded very differently on another, causing misidentification. This misidentification becomes a major bottleneck in generating reliable insights or making trustworthy automated changes.

Another limitation is the narrow scope of many ML classifiers, which often focus on individual elements in isolation. Such models can label a button, recognize a text field, or flag an image, but they struggle to understand how those elements interact with each other as part of a broader user experience. This lack of context makes it difficult to derive nuanced insights, like understanding whether a call-to-action button is ineffective because of the placement of the button relative to a form, or because the button is competing with a nearby promotional banner. The relationships and hierarchies between page components often go unnoticed, and without that higher-level understanding, the ML models' output remains shallow and fragmented.

It would, therefore, be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a method may include receiving contents of a web page, where the contents include at least a plurality of elements, each element including a markup language code. The method may also include detecting at least one relevant element from the contents based on a predefined list of element types. The method may furthermore include extracting attributes from each element into an element feature vector. The method may in addition include classifying each element based on the element feature vector of extracted attributes. The method may moreover include identifying at least one candidate element for web content optimization based on an element classification and the element feature vector. Other embodiments of this aspect include corresponding computer systems, apparatus, and computer programs recorded on one or more computer storage devices, each configured to perform the actions of the methods.

Implementations may include one or more of the following features. The method may include: modifying the markup language code of the at least one candidate element. The method where identifying the at least one candidate element for web content optimization further may include: detecting when a value of a feature of the element feature vector representing the at least one candidate element is above a predetermined threshold distance from a target value; and when the value of the feature of the element feature vector is above the predetermined threshold distance, modifying the markup language code of the at least one candidate element to set the value of the feature of the element feature vector below the predetermined threshold distance. The method where extracting attributes from each element into the element feature vector further may include: detecting at least one of: positional attributes, textual attributes, structural attributes, visual attributes, and behavioral attributes. The method may include: detecting at least one collection of elements from the contents of a web page; extracting attributes from each collection into a collection feature vector; classifying each collection based on the collection feature vector of extracted attributes; and identifying at least one candidate collection for web content optimization based on a collection classification and the collection feature vector. The method where identifying the at least one candidate collection for web content optimization further may include: detecting when a value of a feature of the collection feature vector representing the at least one candidate collection is above a predetermined threshold distance from a target value; and when the value of the feature of the collection feature vector is above the predetermined threshold distance, modifying the markup language code of the at least one candidate collection to set the value of the feature of the collection feature vector below the predetermined threshold distance. The method extracting attributes from each collection into the collection feature vector further may include: detecting, in the collection, at least one of: logical order, semantic may include density, visual hierarchy, functional grouping, and network traffic behavior. The method may include: receiving a training dataset including a plurality of pairs of feature vectors representing at least one element and corresponding ground-truth class labels; inputting the feature vectors and corresponding ground-truth class labels into a machine learning model; and training the machine learning model using the training dataset to minimize a loss function that quantifies a difference between predicted class labels and the corresponding ground-truth class labels. The method may include: generating the training dataset using a generative AI system configured to execute an LLM. The method may include: receiving a dataset having a plurality of unlabeled feature vectors, each feature vector representing at least one element; inputting the feature vectors into an unsupervised machine learning model; and training the unsupervised machine learning model on the dataset to detect latent structures or groupings among the feature vectors based on a measure of feature similarity among the feature vectors. The method may include: generating a prompt for a large language model (LLM) of a generative AI system, the prompt generated based on at least a predetermined template and the markup language code of the at least one candidate element; and processing the generated prompt utilizing the LLM to generate the a modified markup language code of the at least one candidate element. The method where the contents of a web page include a Document Object Model (DOM) of the web page. Implementations of the described techniques may include hardware, a method or process, or a computer-tangible medium.

In one general aspect, a non-transitory computer-readable medium may include one or more instructions that, when executed by one or more processors of a device, cause the device to: receive contents of a web page, where the contents include at least a plurality of elements, each element including a markup language code; detect at least one relevant element from the contents based on a predefined list of element types; extract attributes from each element into an element feature vector; classify each element based on the element feature vector of extracted attributes; and identify at least one candidate element for web content optimization based on an element classification and the element feature vector. Other embodiments of this aspect include corresponding computer systems, apparatus, and computer programs recorded on one or more computer storage devices, each configured to perform the actions of the methods.

In one general aspect, a system may include a processing circuitry. The system may also include a memory containing instructions that, when executed by the processing circuitry, configure the system to: receive contents of a web page, where the contents include at least a plurality of elements, each element including a markup language code. The system may in addition detect at least one relevant element from the contents based on a predefined list of element types. The system may moreover extract attributes from each element into an element feature vector. The system may also classify each element based on the element feature vector of extracted attributes. The system may furthermore identify at least one candidate element for web content optimization based on an element classification and the element feature vector. Other embodiments of this aspect include corresponding computer systems, apparatus, and computer programs recorded on one or more computer storage devices, each configured to perform the actions of the methods.

Implementations may include one or more of the following features. The system where the memory contains further instructions which when executed by the processing circuitry further configure the system to: modify the markup language code of the at least one candidate element. The system where the memory contains further instructions that, when executed by the processing circuitry for identifying the at least one candidate element for web content optimization, further configure the system to: detect when a value of a feature of the element feature vector representing the at least one candidate element is above a predetermined threshold distance from a target value; and when the value of the feature of the element feature vector is above the predetermined threshold distance, modify the markup language code of the at least one candidate element to set the value of the feature of the element feature vector below the predetermined threshold distance. The system where the memory contains further instructions that, when executed by the processing circuitry for extracting attributes from each element into the element feature vector, further configure the system to: detect at least one of: positional attributes, textual attributes, structural attributes, visual attributes, and behavioral attributes. The system where the memory contains further instructions which when executed by the processing circuitry further configure the system to: detect at least one collection of elements from the contents of a web page; extract attributes from each collection into a collection feature vector; classify each collection based on the collection feature vector of extracted attributes; and identify at least one candidate collection for web content optimization based on a collection classification and the collection feature vector. The system where the memory contains further instructions that, when executed by the processing circuitry for identifying the at least one candidate collection for web content optimization, further configure the system to: detect when a value of a feature of the collection feature vector representing the at least one candidate collection is above a predetermined threshold distance from a target value; and when the value of the feature of the collection feature vector is above the predetermined threshold distance, modify the markup language code of the at least one candidate collection to set the value of the feature of the collection feature vector below the predetermined threshold distance. The system where the memory contains further instructions that, when executed by the processing circuitry for extracting attributes from each collection into the collection feature vector, further configure the system to: detect, in the collection, at least one least one of: logical order, semantic may include, density, visual hierarchy, functional group, and network traffic behavior. The system where the memory contains further instructions which when executed by the processing circuitry further configure the system to: receive a training dataset including a plurality of pairs of feature vectors representing at least one element and corresponding ground-truth class labels; input the feature vectors and corresponding ground-truth class labels into a machine learning model; and train the machine learning model using the training dataset to minimize a loss function that quantifies a difference between predicted class labels and the corresponding ground-truth class labels. The system where the memory contains further instructions which when executed by the processing circuitry further configure the system to: generate the training dataset using a generative AI system configured to execute an LLM. The system where the memory contains further instructions which when executed by the processing circuitry further configure the system to: receive a dataset having a plurality of unlabeled feature vectors, each feature vector representing at least one element; input the feature vectors into an unsupervised machine learning model; and train the unsupervised machine learning model on the dataset to detect latent structures or groupings among the feature vectors based on a measure of feature similarity among the feature vectors. The system where the memory contains further instructions which when executed by the processing circuitry further configure the system to: generate a prompt for a large language model (LLM) of a generative AI system, the prompt generated based on at least a predetermined template and the markup language code of the at least one candidate element; and process the generated prompt utilizing the LLM to generate the a modified markup language code of the at least one candidate element. The system where the contents of a web page include a Document Object Model (DOM) of the web page. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
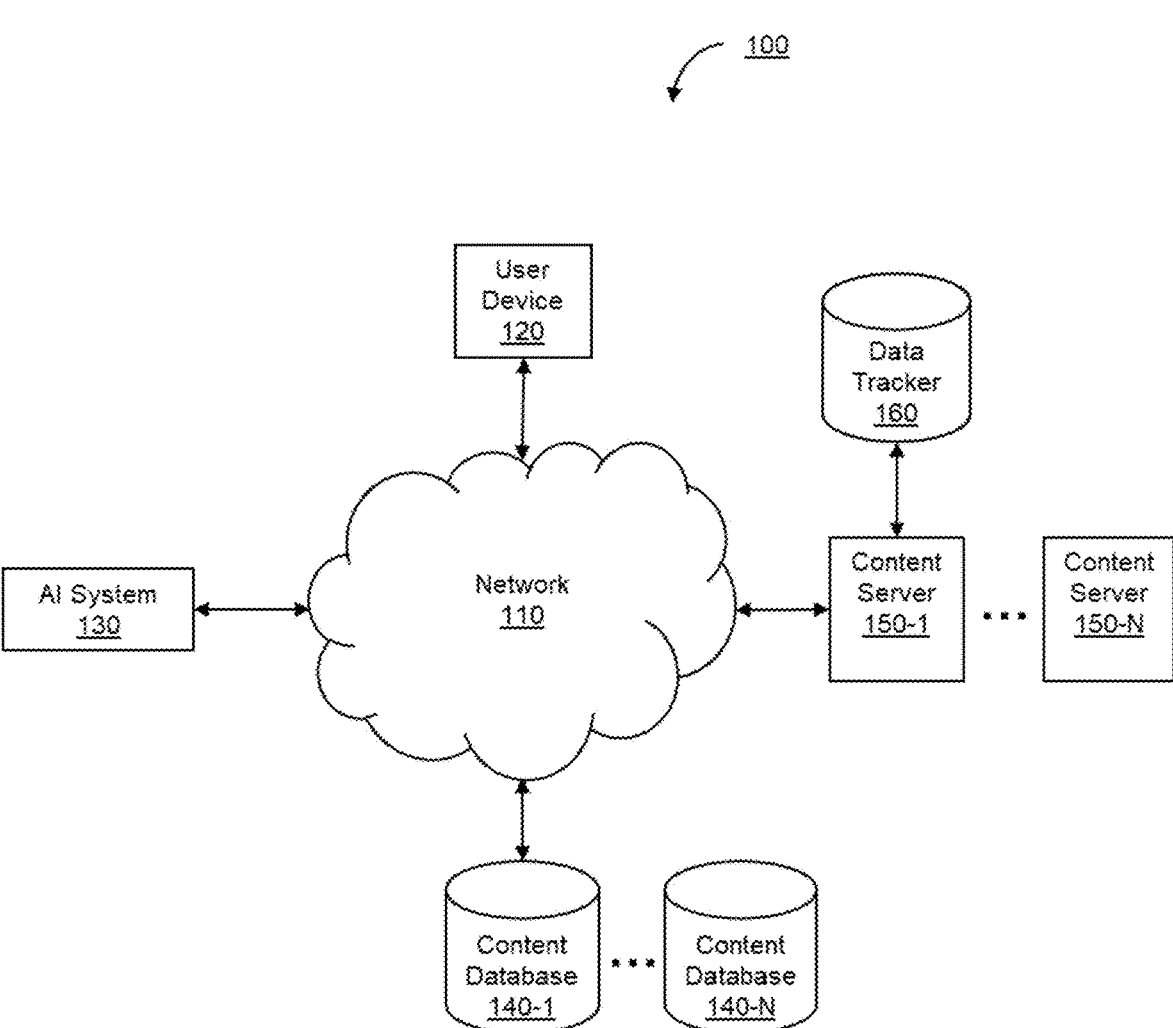
FIG. 1 is an example network diagram of an AI system for classifying elements of a web page, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example network diagram 100 of an AI system for classifying elements of a web page, utilized to describe an embodiment. The network diagram 100 includes a plurality of user devices 120 (collectively referred to as devices 120 or a device 120), content servers 150-1 through 150-N (hereinafter, content server 150 or content servers 150), content database 140-1 through 140-N (hereinafter, content database 140 or content databases 140), AI system 130, and data tracker 160 all connected to a network 110. In an embodiment, a content server 150 is configured to provide web content over a network 110. A content server 150 includes, for example, a web server application, a proxy server application, a load balancer application, a combination thereof, and the like.

In an embodiment, a web server application is implemented for example using Nginx®. In an embodiment, the content server 150 is configured to generate web content, for example from a plurality of contents stored on a content database 140. According to an embodiment, a content is a text, a graphic, a video, a graphical user interface (GUI) element, a combination thereof, and the like.

In an embodiment, a user device 120 requests a web content from the content server 150 over the network 110. In an embodiment, the network 110 includes a wireless, cellular or wired network, a local area network (LAN), a wide area network (WAN), a metro area network (MAN), the Internet, the worldwide web (WWW), similar networks, and any combination thereof.

In some embodiments, the user device 120 is a personal computer, a laptop, a tablet computer, a smartphone, a wearable computing device, an internet of things (IoT) device, a device capable of receiving and displaying notifications, a combination thereof, and the like.

According to an embodiment, it is advantageous to provide a user of the user device 120 with a content which they are likely to interact with. For example, it is advantageous in certain embodiments to provide a user of the user device 120 with a web page where the user is more likely to initiate a transaction, request additional content, engage with a web content, a combination thereof, and the like.

However, a provider of the web content may not always supply the content in the most engaging way possible. Furthermore, different users may interact and respond differently to content depending on how it is presented.

In an embodiment, a user device 120 and a content server 150 are configured to engage in an activity session. For example, an activity session may include a transfer of requests from the user device 120 to the content server 150, a transfer of content from the content server 150 to the user device 120, network packets, data packets, an action initiated by the user device 120, a combination thereof, and the like.

For example, in an embodiment, an activity session includes a plurality of requests for content, an interaction of a user based on the received content, and the like. In an embodiment, the activity session is generated by a customer engagement platform (not shown) which is configured to generate a heatmap, detect behavior, perform behavior analysis, capture user interaction, detect user usage pattern, a combination thereof, and the like.

In an embodiment, data tracker 160 is configured to monitor and record data related to activity sessions between a plurality of user devices 120 with content server 150. In some embodiments, AI system 130 is configured to retrieve data from the data tracker 160. In another embodiment, AI system 130 is configured to monitor the contents of web pages through a proxy.

According to an embodiment, an AI system 130 is configured to determine a metric, a plurality of metrics, etc., to apply based on activity records. For example, in an embodiment, a metric is time based, e.g., to increase time spent on a website by a certain threshold. In certain embodiments, the metric is engagement based, e.g., to increase an amount of users who interact with follow-on content.

In an embodiment, the AI system 130 is further configured to cluster activity sessions. For example, the AI s 130 is configured, in an embodiment, to generate clusters of activity sessions based on a predetermined value, range of values, etc., of an attribute of an activity session.

In certain embodiments, the AI system 130 is configured to receive, access, etc., content from the content database 140, and generate a web content (e.g., an HTML page) for providing a user device 120. In an embodiment, the AI system 130 is configured to generate the web content further based on a metric objective. In some embodiments, the AI system 130 is configured to generate a unique web content for each generated cluster.

According to an embodiment, the AI system 130 is further configured to generate a web content by utilizing a generative artificial intelligence (AI) model. In an embodiment, the generative AI model includes a generative adversarial network (GAN), a general pre-trained transformer (GPT), a BART model, a LLaMa model, a language model (e.g., a large language model, a small language model, etc.), a multimodal generative AI, a combination thereof, and the like. In an embodiment, the multimodal generative AI is configured to generate modified images based on image content, modified text based on a text content, a combination thereof, and the like.

In an embodiment, the AI system 130 is configured to generate a prompt for the generative AI model. For example, in an embodiment, the prompt includes an instruction to generate a web content based on a content accessed from the content database 140, a constraint based on a determined metric, a prompt template, a combination thereof, and the like. In an embodiment, the AI system 130 is configured to select a prompt template from a plurality of prompt templates based, for example, on a classification of the content from the content database 140.

In some embodiments, the AI system 130 is configured to classify the elements of the content using a trained supervised machine learning (ML) model.

In some embodiments, the AI system 130 is configured to generate a plurality of web contents, each web content generated based on the same content accessed from the content database 140. In an embodiment, a plurality of activity sessions are received by the AI system 130, each activity session associated with a web content, each web content generated based on the same content of the content database 140.

In an embodiment, the AI system 130 is configured to generate a modified web content, for example by modifying a markup language associated with a content, associated with an object, etc. In an embodiment, modifying a markup language includes detecting a markup language document having a plurality of data fields, and modifying a value of a data field to another value.

It should be understood that the embodiments described herein are merely exemplary and not intended to be limiting. The arrangement illustrated in FIG. 1 is provided for illustrative purposes only and does not restrict the scope of the disclosed embodiments. Various modifications, adaptations, and alternative configurations may be implemented without departing from the spirit and scope of the disclosed embodiments.

Figure 2:
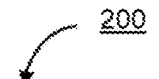
FIG. 2 is an example flow diagram of an AI system for classifying elements of a web page, according to an embodiment.
Figure 2:
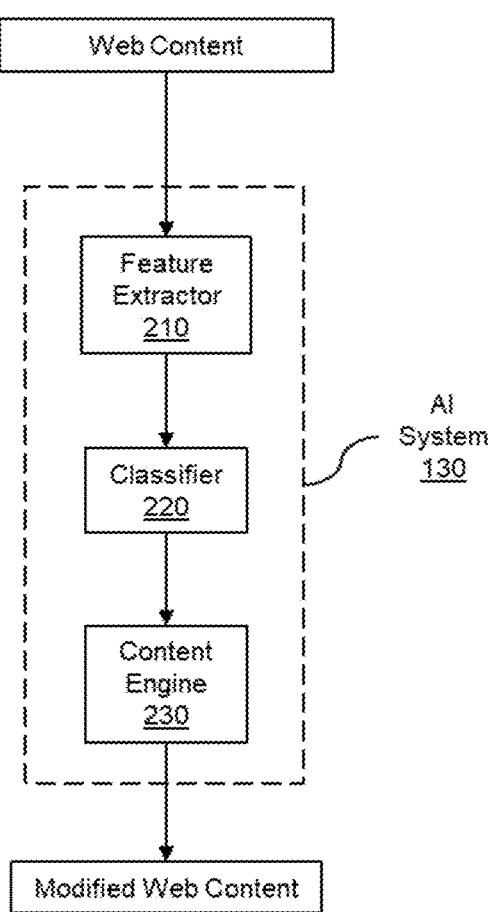

FIG. 2 is an example flow diagram 200 of an AI system for classifying elements and collections of elements of a web page, according to an embodiment. In an embodiment, a web page (or web content) is displayed on a display. For example, in an embodiment, the display is of a mobile device, such as a tablet, smartphone, and the like.

Example flow diagram 200 depicts operations and modules of AI system 130. AI system 130 is configured to analyze the structural and semantic properties of displays (e.g., web pages) by employing a feature extractor 210, a classifier 220, and a content engine 230. AI system 130 is configured to process individual elements of a web page, extract a set of descriptive features for each element, embed each element into a vector representation within a feature space, and apply machine learning (ML) classification techniques to detect the role, type, or function of such elements either individually or collectively as part of larger web page sections.

Feature extractor 210 is configured to ingest the contents of a display such as, but not limited to, a markup language (e.g. HTML) and/or Document Object Model (DOM). Feature extractor 210 is configured to detect discrete elements that may include, but are not limited to, visual components, textual components, multimedia content, and user interface elements.

Feature extractor 210 is configured to process each of these elements to determine a plurality of characteristics. These characteristics may include, but are not limited to, positional attributes, such as coordinates and dimensions within a rendered display, textual attributes extracted from any associated text content, structural attributes extracted from the hierarchical or sibling relationships of the element within the DOM tree, visual attributes reflecting presentation styles or rendering features, and behavioral or interaction-based attributes that may include event listeners or dynamic properties.

Feature extractor 210 is configured to transform each element into a feature vector representation based on the extracted features. The vector representation may be, in one embodiment, a fixed-length vector, or, in other embodiments, structured otherwise. In some embodiments, the embedding process may utilize conventional statistical techniques. In other embodiments, embedding may utilize advanced neural network-based encoders and may be context-aware depending on the surrounding elements.

Classifier 220 is configured to determine, based on the features of an inputted element, a classification output for each element of the web content inputted into the classifier 220. In one embodiment, classifier 220 is configured to utilize supervised machine learning techniques. According to this embodiment, an ML model of the classifier 220 is trained using a dataset comprising labeled examples of web page elements, where each training instance includes both a feature vector and a corresponding ground-truth class label. These class labels may denote content types, semantic roles, or functional categories. In an embodiment, the training data and the class labels are generated by a generative AI (genAI) system. The ML model of the classifier 220 is trained to minimize a loss function that quantifies the difference between predicted and actual labels, and training may involve optimization techniques such as gradient descent or variants thereof. According to this embodiment, once the ML model of the classifier 220 is trained, the ML model of the classifier 220 is configured to accept new feature vectors extracted from unseen web pages and to assign them to one or more predefined classes.

In another embodiment, classifier 220 is configured to utilize unsupervised machine learning techniques. According to this embodiment, a ML model of the classifier 220 detects latent structures or groupings within the dataset of feature vectors without relying on explicit labels. Unsupervised learning may be used to discover novel element types, to cluster similar design patterns, to assist in bootstrapping new labeled datasets for subsequent supervised training, a combination thereof, and the like.

AI system 130 is further configured to evaluate not only individual elements but also collections of elements of a web page. According to this embodiment, feature extractor 210 is configured to extract collections of a web page based on DOM subtrees, visual proximity, or functional cohesion of elements of the web page. Feature extractor 210 is configured to process each of these collections to determine a plurality of characteristics. These characteristics may include, but are not limited to, positional attributes, such as coordinates and dimensions within a rendered display, textual attributes extracted from any associated text content, structural attributes extracted from the hierarchical or sibling relationships of the element within the DOM tree, visual attributes reflecting presentation styles or rendering features, and behavioral or interaction-based attributes that may include event listeners or dynamic properties.

Feature extractor 210 is configured to transform each collection into a feature vector representation based on the extracted characteristics. A vector representation is defined and discussed above. Classifier 220 is configured to determine, based on the features of an inputted collection, a classification output for each collection of the web content inputted into the classifier 220. In one embodiment, classifier 220 is configured to utilize supervised machine learning techniques to classify collections of web pages. According to this embodiment, an ML model of the classifier 220 is trained using a dataset comprising labeled examples of web page collections, where each training instance includes both a feature vector and a corresponding ground-truth class label. These class labels may denote content types, semantic roles, or functional categories of collections of the web pages. In an embodiment, the training data and the class labels are generated by a genAI system. In another embodiment, classifier 220 is configured to utilize unsupervised machine learning techniques to classify collections of web pages. According to this embodiment, a ML model of the classifier 220 detects latent structures or groupings within the dataset of feature vectors without relying on explicit labels. Unsupervised learning may be used to discover novel collection types, to cluster similar design patterns, or to assist in bootstrapping new labeled datasets for subsequent supervised training.

Content engine 230 leverages the output of the classification process and the underlying feature representations to synthesize, modify, or restructure web page content. Content engine 230 may employ template-based, rule-based, or AI-based generative techniques, including but not limited to LLMs, to produce content that aligns with specified objectives.

In certain embodiments, content engine 230 is configured to generate the modified web page by modifying content, modifying a position of the content, modifying a color of the content, modifying a font of a textual content, modifying a size of the content, a combination thereof, and the like. It should be noted that reference to modifying the contents of the web page includes modifying a markup language code associated with the contents of the web page. Modification of contents of web pages is discussed in more detail with respective to S350, FIG. 3., and S440, FIG. 4. Embodiments associated with modifying contents of web pages can be found in the referenced-above U.S. patent application Ser. No. 18/930,617.

Figure 3:
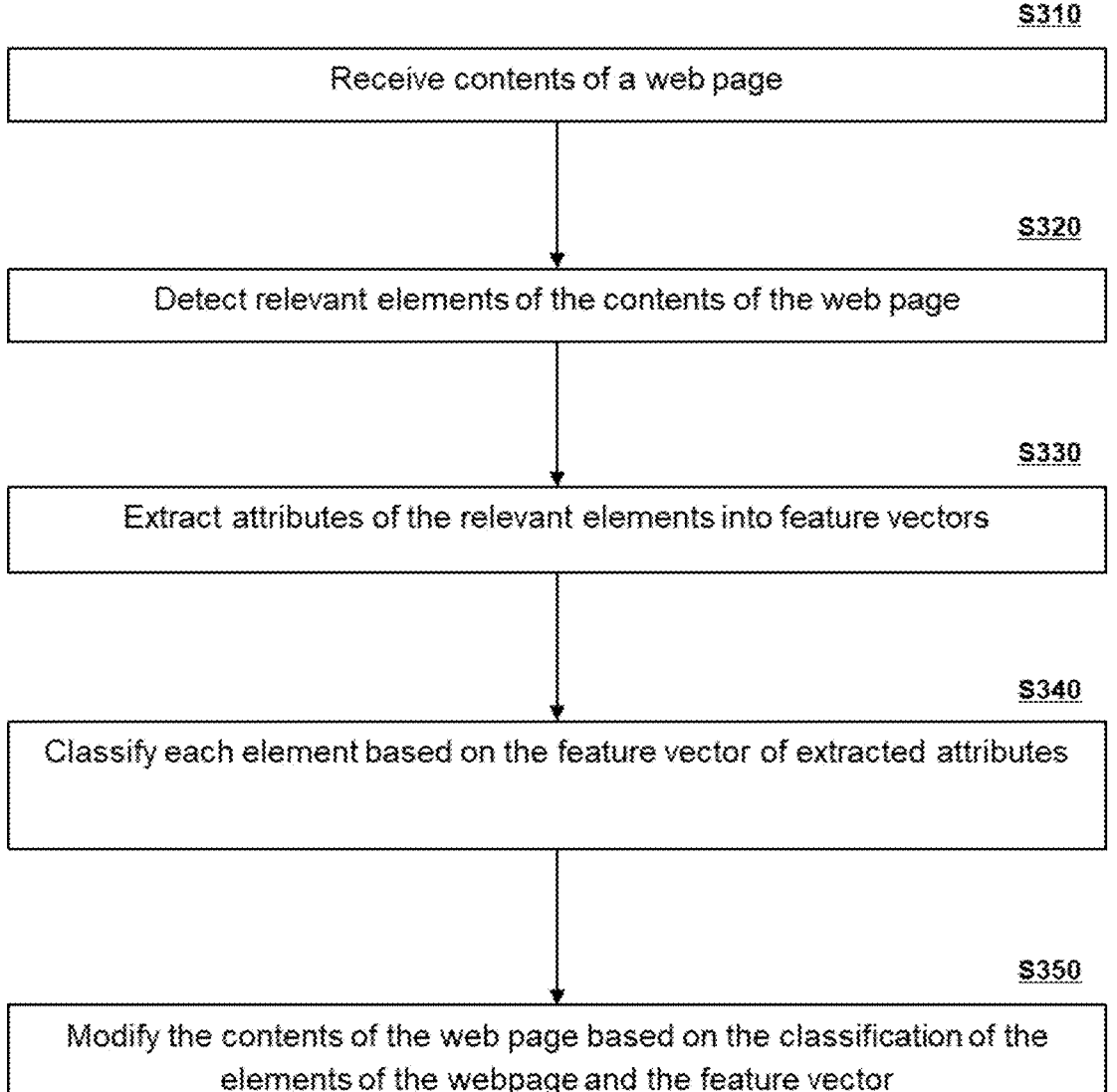
FIG. 3 is an example flowchart of a method for performing modification to a web page based on a classification of elements of the web page, according to an embodiment.

FIG. 3 is an example flowchart 300 of a method for performing modification to a web page based on a classification of elements of the web page, according to an embodiment.

At S310, contents of a web page are received. In an embodiment, contents include discrete elements such as, but not limited to, visual components, textual components, multimedia content, and user interface elements. The contents may be retrieved through a markup language (e.g. HTML) and/or Document Object Model (DOM).

At S320, relevant elements of the contents of the web page are detected. In an embodiment, step S320 is optional. According to this embodiment, all elements or a subset thereof are detected regardless of relevance.

In an embodiment, relevant elements are detected by comparing semantically recognized elements of a given web page to a predefined list of element types or identifiers that have been previously determined to be relevant. This predefined list may include, for example, HTML tags, class names, ID attributes, or semantic labels. Detecting relevant elements includes extracting elements from the DOM. A semantic comparison is made between the extracted elements and the entries in the predefined list. This comparison can be performed using simple string matches, regular expressions, or more advanced semantic similarity techniques (e.g., cosine similarity of embedded text representations). The elements that match or are sufficiently similar to entries in the list are flagged as relevant.

Examples of relevant elements include, but are not limited to, a call to action, sticky call to action, main navigation bar, cart button, login button, search box, top announcement bar, popup, product image, product name, product description, detailed product information area, price, quantity selector, product options selector, product rating bar, reviews section, shipping badge, returns badge, upsell options, cross-sell options, chat-with-an-agent button, and footer.

In another embodiment, a large language model (LLM) is employed to determine which elements of a web page are relevant, based on a natural language prompt. The LLM is configured to receive at least a constraint, a prompt, a prompt template, HTML content of the page, a combination thereof, and the like. For example, on a product page, the prompt might task the LLM to determine which elements are relevant to understanding the product being sold. According to this embodiment, the model detects the structure and semantics of the content of the page and generates a list of which elements are relevant. The generated list may be expressed directly as HTML element descriptions, CSS selectors, or textual references that are then mapped back to the DOM.

At S330, attributes of the relevant elements are extracted into element feature vectors. In an embodiment, when all elements or a subset thereof are detected regardless of relevance, attributes of such elements are extracted into feature vectors according to various embodiments disclosed hereinbelow.

In an embodiment, a plurality of attributes are extracted from each element. According to an embodiment, attributes of elements are extracted, by a feature extractor, from a markup language (e.g., HTML) document, Document Object Model (DOM), a combination thereof, and the like. Attributes include, but are not limited to, positional attributes such as coordinates and dimensions within a rendered display; textual attributes extracted from any associated text content; structural attributes inferred from the hierarchical or sibling relationships of the element within the DOM tree; visual attributes based on presentation styles or rendering features; behavioral attributes, such as event listeners or dynamic properties; a combination thereof; and the like.

In an embodiment, a web content is loaded into a module, such as a browser environment, a rendering engine, a combination thereof, and the like, which is configured to enable access to a fully rendered state of the web content. Once the web content is rendered, the structure (e.g., DOM) is traversed systematically, and for each element encountered, a set of attributes that characterize the visual, structural, semantic, and interactive properties of the element are collected.

Each element is transformed into a feature vector representation based on the extracted attributes. In some embodiments, the extracted attributes are encoded into a numerical representation by mapping the features into a multidimensional feature space. In some embodiments, encoding may include transforming textual content into vector embeddings using pretrained language models, statistical text representation techniques, a combination thereof, and the like. In some embodiments, encoding may include transforming element types and attributes using categorical encoding mechanisms. In some embodiments, encoding may include normalizing and embedding visual and positional features into the vector to maintain spatial context. The resultant numerical feature vector that represents the original element is formatted for machine learning models that are configured to operate in vector space.

In certain embodiments, a contextual embedding model, such as a bidirectional encoder representation from transformer (BERT) model, a generative pre-trained transformer (GPT) model, and the like may be utilized.

Furthermore, in some embodiments, semantic classes associated with the feature vectors are generated. Each semantic class corresponds to a category or type of element found on web pages, such as, but not limited to, a navigation bar, product title, and a call-to-action button.

In one embodiment, semantic classes are generated using unsupervised learning techniques. According to this embodiment, feature vectors are clustered according to vector similarity. It is determined, using a distance metric (e.g., cosine similarity, Euclidean distance, Manhattan distance, etc.), whether a feature vector is sufficiently semantically similar to existing clusters. Feature vectors that exhibit similarity to an existing cluster beyond a pre-defined threshold are grouped with the existing cluster. If a feature vector does not meet the similarity threshold for any existing cluster, a new cluster, to which the feature vector is assigned, is generated.

In another embodiment, semantic classes are defined through semi-supervised learning techniques. Feature vectors are labeled with pre-defined semantic classes. These labeled feature vectors are used to train a classification model that maps unlabeled feature vectors to semantic classes. The trained model generalizes a classification function learned during training to new vectors, enabling automatic classification of elements not seen during training. In an embodiment, the training data and the class labels are generated by a genAI system.

At S340, each element is classified based on the element feature vector representing each element. In an embodiment, each element is classified by classifier 220, FIG. 2.

In one embodiment, a supervised ML model is employed. In this embodiment, the unsupervised model is trained. This training is performed using a dataset that includes labeled examples of web page elements, with each training instance including both a feature vector and a corresponding ground-truth class label. These class labels may denote content types, semantic roles, or functional categories. In other embodiments, unsupervised ML techniques are used. In an embodiment, the training data and the class labels are generated by a genAI system. Classification is explained in more detail with respect to classifier 220, FIG. 2.

In an embodiment, classifying an element utilizing a feature vector includes detecting a class of elements, each element represented by a feature vector, and determining that the feature vector representing the element has a distance below a predetermined threshold to each of the feature vectors representing the elements of the class.

At S350, the contents of the web page are modified. It should be noted that reference to modifying the contents of the web page includes modifying a markup language code associated with the contents of the web page. Inputs, such as, but not limited to, the classification and the underlying feature representations are utilized to modify the contents of the web page. In certain embodiments, a content engine (e.g. content engine 230, FIG. 2) is configured to generate the modified web page by modifying content, modifying a position of the content, modifying a color of the content, modifying a font of a textual content, modifying a size of the content, a combination thereof, and the like. In certain embodiments, a multimodal generative AI model, configured to generate modified images based on an image content, modified text based on a text content, a combination thereof, and the like, is utilized.

In an embodiment, a generative AI model is utilized to modify the contents of the web page. The generative AI model is configured to receive a content, a constraint, a prompt, a prompt template, a metric value, a metric threshold, a combination thereof, and the like, and the classification output of the elements of the web page. The generative AI model generates modified content based on the aforementioned inputs.

In an embodiment, values of features of the element feature vectors of the extracted attributes are evaluated to determine whether each value is below a predetermined threshold distance from a corresponding target value. According to this embodiment, the values of the features are evaluated to determine whether each value of a feature in a particular dimension is below a predetermined threshold distance respective of a target value along the same particular dimension a multi-dimensional feature space. Values of features that are below the predetermined threshold distance refer to attributes of an element that are associated with optimal user engagement, functional effectiveness, a combination thereof, and the like.

For example, feature vectors that represent elements that are clickable and have text including, "Buy," "Buy Now!," "Buy Now (Before It's Gone)," or "Get," may be classified into a "purchase action" class. It may be identified that the buy button with "Get" in the text portion of the button is a candidate element for web optimization. A candidate element for web optimization is an element in which it is detected that a value of a feature in the element feature vector representing the element is above the predetermined threshold distance from a corresponding target value.

According to the above example, the value of the feature in the element feature vector for the "Get" button may be, but is not limited to, a value of a feature that is in a dimension that corresponds to urgency level in the text portion of the button element.

According to an embodiment, the markup language code of the candidate element is modified to an extent that sets the value of the feature in the element feature vector below the predetermined threshold distance. According to the above example, markup language code of the candidate element is modified so the text portion includes, but is not limited to, "Buy Now!," or "Buy Now (Before It's Gone)." This modification to the markup language code sets the value of feature in the dimension corresponding to urgency level in the text portion below the predetermined threshold distance from the target value. In an embodiment, a text content that is modified into a modified text content may be performed using a generative AI model such as a transformer model configured to generate text content.

Although FIG. 3 shows example blocks of flowchart 300, in some implementations, flowchart 300 may include additional blocks, fewer blocks, different blocks, or differently arranged blocks than those depicted in FIG. 3. Additionally, or alternatively, two or more of the blocks of flowchart 300 may be performed in parallel.

Figure 4:
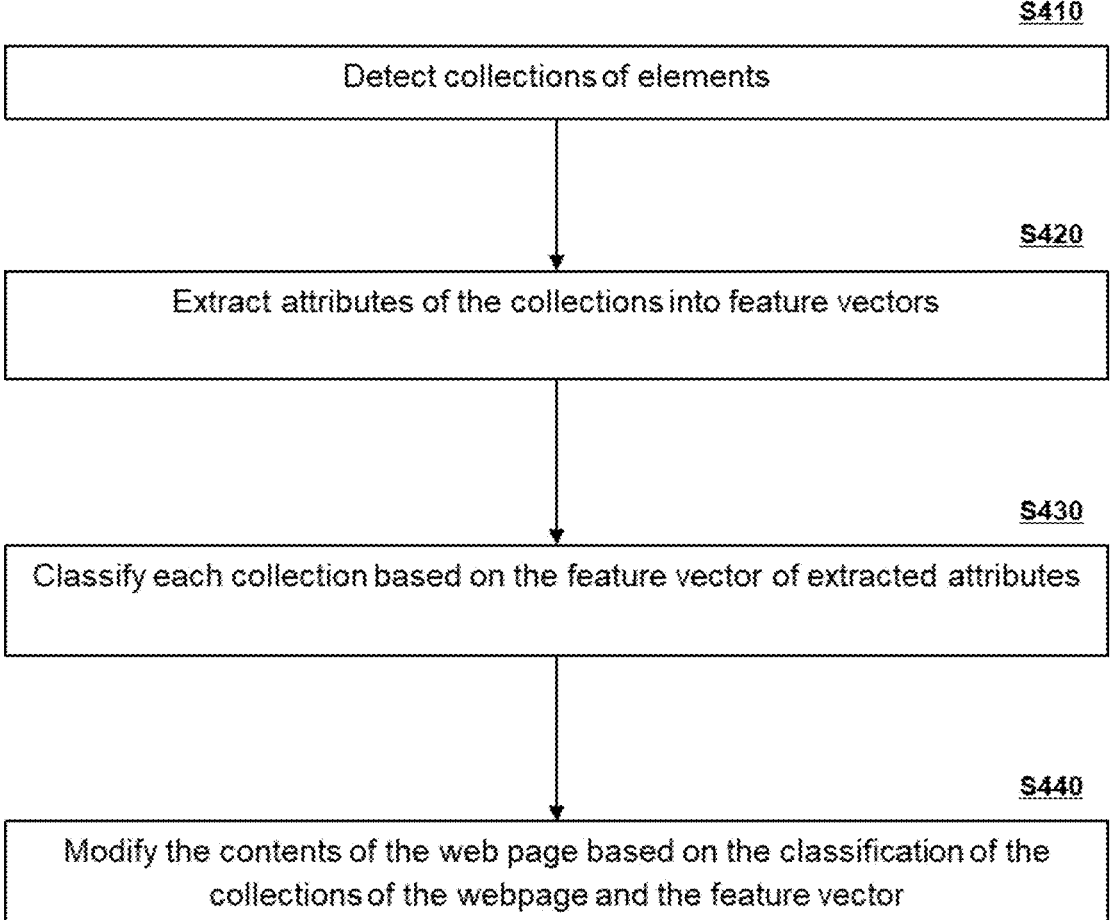
FIG. 4 is an example flowchart of a method for performing modification to a web page based on classification of collections of elements of the web page according to an embodiment.

FIG. 4 is an example flowchart 400 of a method for performing modification to a web page based on classification of collections of elements of the web page according to an embodiment.

At S410, collections of elements are detected. In an embodiment, detecting collections of web page elements is based on the structural hierarchy of the DOM of the web page, where subtrees are examined to detect collections of elements that share a common parent. In another embodiment, a visual rendering of the web page may be analyzed to determine proximity between elements based on the relevant positions of the elements in the rendered web page. In an embodiment, collections may be inferred from shared scripting behaviors. In another embodiment, collections may be inferred from consistent user interactions, such as repeated patterns of clicks, form submissions, or navigational transitions.

At S420, attributes of the collections of elements are extracted into collection feature vectors. In an embodiment, a plurality of attributes are extracted from each collection. According to an embodiment, attributes of collections are extracted, by a feature extractor, from a markup language (e.g. HTML) document, Document Object Model (DOM), a combination thereof, and the like. Attributes include, but are not limited to, positional attributes such as coordinates and dimensions within a rendered display; textual attributes extracted from any associated text content; structural attributes inferred from the hierarchical or sibling relationships of the element within the DOM tree; visual attributes based on presentation styles or rendering features; behavioral attributes, such as event listeners or dynamic properties; a combination thereof; and the like.

Additionally, in some embodiments, relevant attributes of collections of elements include, but are not limited to, logical order, which is the sequence of elements presented based on logical coherence; semantic consistency, which is the degree of conceptual or linguistic consistency across a collection of elements; density, which is the spatial density of elements within a defined area; visual hierarchy, which describes how a user's attention is guided across a group of elements based on factors such as, but not limited to, size, color, contrast, and alignment of elements; functional grouping, which is the coherent function (e.g., product selection, form submission) of a collection of elements; and network traffic behavior, which is the flow of user traffic across a collection of elements.

In an embodiment, the feature extractor is configured to load a web page into a module, such as a browser environment, a rendering engine, a combination thereof, and the like. Once the web page is rendered, the structure (e.g., DOM) is traversed systematically, and for each collection encountered, the feature extractor collects a set of attributes that characterize the visual, structural, semantic, and interactive properties of the collections.

Each collection of elements is encoded into a feature vector representation based on the extracted attributes. Vector embedding is discussed in detail above. In certain embodiments, a contextual embedding model, such as a bidirectional encoder representation from transformer (BERT) model, a generative pre-trained transformer (GPT) model, and the like may be utilized.

Furthermore, in some embodiments, semantic classes associated with the feature vectors are generated. Each semantic class corresponds to a category or type of collection of elements found on web pages. In one embodiment, semantic classes are generated using unsupervised learning techniques. According to this embodiment, feature vectors are clustered according to vector similarity. It is determined, using a distance metric (e.g., cosine similarity, Euclidean distance, Manhattan distance, etc.), whether a feature vector is sufficiently semantically similar to existing clusters. Feature vectors that exhibit similarity to an existing cluster beyond a pre-defined threshold are grouped with the existing cluster. If a feature vector does not meet the similarity threshold for any existing cluster, a new cluster, to which the feature vector is assigned, is generated.

In another embodiment, semantic classes are defined through semi-supervised learning techniques. Feature vectors are labeled with pre-defined semantic classes. These labeled feature vectors are used to train a classification model that maps unlabeled feature vectors to semantic classes. The trained model generalizes a classification function learned during training to new vectors, enabling automatic classification of collections not seen during training. In an embodiment, the training data and the class labels are generated by a genAI system.

At S430, each collection is classified based on the collection feature vector representing the collection. In an embodiment, each collection is classified by classifier 220, FIG. 2.

In one embodiment, a supervised ML model is employed. In this embodiment, the supervised model is trained using a dataset that includes labeled examples of collections of web page elements, with each training instance including both a feature vector and a corresponding ground-truth class label. These class labels may denote content types, semantic roles, or functional categories. In other embodiments, unsupervised ML techniques are used. In an embodiment, the training data and the class labels are generated by a genAI system. Classification is explained in more detail with respect to classifier 220, FIG. 2.

In an embodiment, classifying a collection of elements utilizing a feature vector includes detecting a class of a collection, each collection represented by a feature vector, and determining that the feature vector representing the collection has a distance below a predetermined threshold to each of the feature vectors representing the collection of the class. In an embodiment, the most likely semantic class of the collection is determined for each feature vector representing a collection. According to an embodiment, this classification may distinguish between categories such as navigational areas, headers, footers, forms, advertisements, or main content regions of a web page.

At S440, the contents of the web page are modified. It should be noted that reference to modifying the contents of the web page includes modifying a markup language code associated with the contents of the web page. Inputs, such as, but not limited to, the classification and the underlying feature representations are utilized to modify the contents of the web page. In certain embodiments, a content engine (e.g. content engine 230, FIG. 2) is configured to generate the modified web page by modifying content, modifying a position of the content, modifying a color of the content, modifying a font of a textual content, modifying a size of the content, a combination thereof, and the like. In certain embodiments, a multimodal generative AI model, configured to generate modified images based on an image content, modified text based on a text content, a combination thereof, and the like, is utilized.

In an embodiment, a generative AI model is utilized to modify the contents of the web page. The generative AI model is configured to receive a content, a constraint, a prompt, a prompt template, a metric value, a metric threshold, a combination thereof, and the like, and the classification output of the collection of elements of the web page. The generative AI model generates modified content based on the aforementioned inputs. In an embodiment, modifications may include actions such as, but not limited to, reformatting, hiding, reordering, or enhancing collections of elements for accessibility, personalization, engagement, a combination thereof, and the like. In an embodiment, the modifications are made to markup language code associated with the contents of the web page.

In an embodiment, values of features of the collection feature vectors are evaluated to determine whether each value is below a predetermined threshold distance from a corresponding target value. According to this embodiment, the values of the features are evaluated to determine whether each value of a feature in a particular dimension is below a predetermined threshold distance respective of a target value along the same particular dimension a multi-dimensional feature space. Values of features that are below the predetermined threshold distance refer to attributes of a collection of elements that are associated with optimal user engagement, functional effectiveness, a combination thereof, and the like.

For example, feature vectors each representing of a collection of elements may be based on attributes that include, but are not limited to, dropdown menus or radio buttons for selecting product variations such as size, color, or quantity; text or label elements displaying current pricing, discounts, and availability; button elements for actions like "Add to Cart" or "Buy Now;" text fields or selection controls for choosing shipping methods and displaying estimated delivery times; iconography or badges indicating accepted payment methods; toggle elements for selecting between one-time purchase and subscription; and text blocks summarizing the return policy. According to this example, these feature vectors may be classified into a "purchase section," class based on attributes represented by the feature vectors.

In an embodiment, it may be identified that the buy box of a web page includes at least one candidate element (i.e. a candidate collection of elements for web optimization. A candidate collection for web optimization is a collection of elements in which it is detected that a value of a feature in the collection feature vector representing the collection of elements is above the predetermined threshold distance from a corresponding target value. According to the above example, the value of the feature in the element feature vector for the buy box may be, but is not limited to, a value of a feature that is in a dimension that corresponds to visual prominence of the buy button in the buy box collection. According to an embodiment, the markup language code of the candidate collection of elements is modified to an extent that sets the value of the feature in the collection feature vector below the predetermined threshold distance. According to the above example, the markup language code of the buy box collection is modified to an extent that increases the visual prominence of the buy button in the buy box collection. This modification sets the value of the feature that is in the dimension corresponding to visual prominence of a buy button below the predetermined threshold distance. In an embodiment, a generative AI model may be utilized to modify the markup language code associated with, for example, the visual hierarchy of the elements in the collection of elements to ensure that the buy button is displayed a level of prominence above the predefined threshold.

Although FIG. 4 shows example blocks of flowchart 400, in some implementations, flowchart 400 may include additional blocks, fewer blocks, different blocks, or differently arranged blocks than those depicted in FIG. 4. Additionally, or alternatively, two or more of the blocks of flowchart 400 may be performed in parallel.

Figure 5:
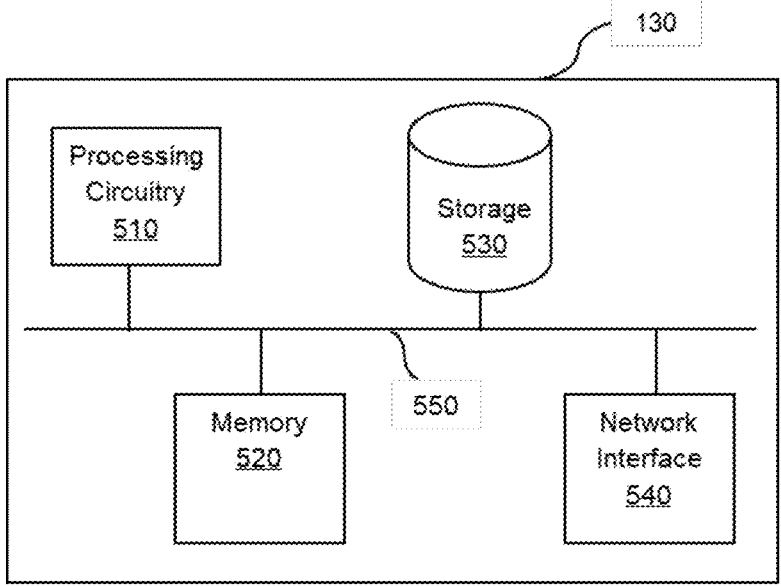
FIG. 5 is an example schematic diagram of an AI system according to an embodiment.

FIG. 5 is an example schematic diagram of an AI system 130 according to an embodiment. The AI system 130 includes, according to an embodiment, a processing circuitry 510 coupled to a memory 520, a storage 530, and a network interface 540. In an embodiment, the components of the AI system 130 are communicatively connected via a bus 550.

In certain embodiments, the processing circuitry 510 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In at least some embodiments, the processing circuitry 510 is configured to execute generative artificial intelligence (genAI) models, perform inference using or otherwise apply genAI models, train genAI models, fine-tune genAI models, combinations thereof, and the like. Such genAI models are configured to produce text, images, videos, or other forms of data, and may include, but are not limited to, language models (for example, but not limited to, large language models, small language models, etc.), text-to-image artificial intelligence (AI) image generation systems, text-to-video AI video generators, combinations thereof, and the like. To this end, the processing circuitry 510 may be adapted to realize a transformer deep learning architecture (e.g., a generative pre-trained transformer [GPT], bidirectional encoder representations from transformers [BERT], text-to-text transfer transformer [T5], etc.), a diffusion model, both, and the like.

In accordance with various such embodiments, the hardware utilized for the processing circuitry 510 is selected in order to enable genAI functionality based on factors such as, but not limited to, parallelism (e.g., amounts of parallel processing to be performed), memory demands (e.g., amounts of random access memory [RAM] utilized to store model weights and training during processing or video RAM [VRAM] to support large language models), clock speeds, thread counts, storage (for example, to support certain amounts of storage or storage speeds), cooling (e.g., liquid cooling or air cooling systems), power supply (e.g., in order to enable a target wattage used for certain kinds of activities), networking and connectivity (e.g., in order to support seamless data transfer for deployments involving communications between or among multiple machines or clusters), combinations thereof, and the like.

In embodiments which utilize large language models (LLMs) or otherwise perform operations which may require or be enhanced through use of parallel processing, the processing circuitry 510 may include one or more GPUs or other processing units suitable for parallel processing. Such GPUs may be configured to perform matrix multiplication operations including, but not limited to, performing dot product operations in order to support neural network operations (for example, by performing dot product operations for hidden layer computations) or performing dot product operations in an attention mechanism in order to compute a similarity score between vectors during attention weight computation. In at least some such embodiments using GPUs, the processing circuitry 510 may include a number of CPU cores which is equal to or greater than the number of GPUs in order to facilitate or otherwise support parallel processing via multiple GPUs.

In an embodiment, the memory 520 is a volatile memory (e.g., random access memory, etc.), a non-volatile memory (e.g., read only memory, flash memory, etc.), a combination thereof, and the like. In some embodiments, the memory 520 is an on-chip memory, an off-chip memory, a combination thereof, and the like. In certain embodiments, the memory 520 is a scratch-pad memory for the processing circuitry 510.

In one configuration, software for implementing one or more embodiments disclosed herein is stored in the storage 530, in the memory 520, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 510, cause the processing circuitry 510 to perform the various processes described herein, in accordance with an embodiment.

In some embodiments, the storage 530 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 540 is configured to provide the AI system 130 with communication with, for example, the network 120, the content server 140, the content database 145, and the like, according to an embodiment.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A computer-implemented method for optimizing web content, comprising:

receiving contents of a web page, wherein the contents include at least a plurality of elements, each element including a markup language code;

detecting, using a semantic similarity technique, at least one relevant element of the plurality of elements from the contents based on a semantic similarity to an element in a predefined list of element types;

generating at least one element feature vector representing the at least one relevant element in a vector database, wherein each feature of the least one element feature vector represents an attribute of the at least one relevant element;

classifying, using a machine learning model trained on labeled examples of element feature vectors, the at least one element feature vector;

identifying at least one candidate element of the at least one relevant element for web content optimization based on the classification for the at least one candidate element and the element feature vector representing the at least one candidate element;

generating markup language code for at least one web-optimized element, wherein generating the markup language code for the at least one web-optimized element replaces the at least one candidate element to change the contents of the web page;

the computer-implemented method further comprising:

detecting, using a semantic similarity technique, at least one collection of elements of the plurality of elements from the contents;

generating at least one collection feature vector representing the at least one relevant collection in a vector database, wherein each feature of the least one collection feature vector represents an attribute of the at least one collection;

classifying, using a machine learning model trained on labeled examples of collection feature vectors, the at least one collection feature vector;

identifying at least one candidate collection of the at least one collection for web content optimization based on the classification for the at least one candidate collection and the collection feature vector representing the at least one candidate collection; and generating markup language code for at least one web-optimized collection, wherein generating the markup language code for the at least one web-optimized collection replaces the at least one candidate collection to change the contents of the web page.

2. The computer-implemented method of claim 1, further comprising:

modifying the markup language code of the at least one candidate element.

3. The computer-implemented method of claim 1, wherein identifying the at least one candidate element of the at least one relevant element for web content optimization further comprises:

detecting when a value of a feature of the at least one element feature vector representing the at least one candidate element is above a predetermined threshold distance from a target value; and when the value of the feature of the at least one element feature vector is above the predetermined threshold distance, modifying the markup language code of the at least one candidate element to set the value of the feature of the at least one element feature vector below the predetermined threshold distance.

4. The computer-implemented method of claim 1, further comprising:

detecting, in the at least one relevant element, at least one of: positional attributes, textual attributes, structural attributes, visual attributes, and behavioral attributes.

5. The computer-implemented method of claim 1, wherein identifying the at least one candidate collection of the at least one collection for web content optimization further comprises:

detecting when a value of a feature of the at least one collection feature vector representing the at least one candidate collection is above a predetermined threshold distance from a target value; and when the value of the feature of the at least one collection feature vector is above the predetermined threshold distance, modifying the markup language code of the at least one candidate collection to set the value of the feature of the at least one collection feature vector below the predetermined threshold distance.

6. The computer-implemented method of claim 1, further comprising:

detecting, in the at least one collection, at least one of: logical order, semantic consistency, density, visual hierarchy, functional grouping, and network traffic behavior.

7. The computer-implemented method of claim 1, further comprising:

generating a prompt for a large language model (LLM) of a generative AI system, the prompt generated based on at least a predetermined template and the markup language code of the at least one candidate element; and processing the generated prompt utilizing the LLM to generate the markup language code of the at least one web-optimized element.

8. The computer-implemented method of claim 1, wherein the contents of a web page include a Document Object Model (DOM) of the web page.

9. The computer-implemented method of claim 1, further comprising:

receiving a training dataset including a plurality of pairs of feature vectors representing at least one element and corresponding ground-truth class labels;

inputting the feature vectors and corresponding ground-truth class labels into the machine learning model; and training the machine learning model using the training dataset to minimize a loss function that quantifies a difference between predicted class labels and the corresponding ground-truth class labels.

10. The computer-implemented method of claim 9, further comprising: generating the training dataset using a generative AI system configured to execute an LLM.

11. The computer-implemented method of claim 1, further comprising:

receiving a dataset comprising a plurality of unlabeled feature vectors, each feature vector representing at least one element;

inputting the feature vectors into an unsupervised machine learning model; and training the unsupervised machine learning model on the dataset to detect latent structures or groupings among the feature vectors based on a measure of feature similarity among the feature vectors.

12. A non-transitory computer-readable medium storing a set of instructions for optimizing web content, the set of instructions comprising: one or more instructions that, when executed by one or more processors of a device, cause the device to:

receive contents of a web page, wherein the contents include at least a plurality of elements, each element including a markup language code;

detect, using a semantic similarity technique, at least one relevant element from the contents based on a semantic similarity to an element in a predefined list of element types;

generate at least one element feature vector in a vector database, wherein each feature of the at least one element feature vector represents an attribute of the at least one relevant element;

classify, using a machine learning model trained on labeled examples of element feature vectors, the at least one element feature vector; identify at least one candidate element of the at least one relevant element for web content optimization based on the classification for the at least one candidate element and the element feature vector representing the at least one candidate element;

generate markup language code for at least one web-optimized element, wherein generating the markup language code for the at least one web-optimized element replaces the at least one candidate element to change the contents of the web page;

the device further to:

detecting, using a semantic similarity technique, at least one collection of elements of the plurality of elements from the contents;

generating at least one collection feature vector representing the at least one relevant collection in a vector database, wherein each feature of the least one collection feature vector represents an attribute of the at least one collection:

classifying, using a machine learning model trained on labeled examples of collection feature vectors, the at least one collection feature vector;

identifying at least one candidate collection of the at least one collection for web content optimization based on the classification for the at least one candidate collection and the collection feature vector representing the at least one candidate collection; and generating markup language code for at least one web-optimized collection, wherein generating the markup language code for the at least one web-optimized collection replaces the at least one candidate collection to change the contents of the web page.

13. A system for optimizing web content comprising:

a processing circuitry;

a memory, the memory containing instructions that, when executed by the processing circuitry, configure the system to:

receive contents of a web page, wherein the contents include at least a plurality of elements, each element including a markup language code;

detect, using a semantic similarity technique, at least one relevant element from the contents based on a semantic similarity to an element in a predefined list of element types;

generate at least one element feature vector in a vector database, wherein each feature of the at least one element feature vector represents an attribute of the at least one relevant element;

classify, using a machine learning model trained on labeled examples of element feature vectors, the at least one element feature vector;

identify at least one candidate element of the at least one relevant element for web content optimization based on the classification for the at least one candidate element and the element feature vector representing the at least one candidate element; and generate markup language code for at least one web-optimized element, wherein generating the markup language code for the at least one web-optimized element replaces the at least one candidate element to change the contents of the web page;

the system further to:

detect, using a semantic similarity technique, at least one collection of elements of the plurality of elements from the contents;

generate at least one collection feature vector in a vector database, wherein each feature of the least one collection feature vector represents an attribute of the at least one collection;

classify, using a machine learning model trained on labeled examples of collection feature vectors, the at least one collection feature vector;

identify at least one candidate collection of the at least one collection for web content optimization based on the classification for the at least one candidate collection and the collection feature vector; and generate markup language code for at least one web-optimized collection, wherein generating the markup language code for the at least one web-optimized collection replaces the at least one candidate collection to change the contents of the web page.

14. The system of claim 13, wherein the memory contains further instructions which when executed by the processing circuitry further configure the system to:

modify the markup language code of the at least one candidate element.

15. The system of claim 13, wherein the memory contains further instructions that, when executed by the processing circuitry for identifying the at least one candidate element of the at least one relevant element for web content optimization, further configure the system to:

detect when a value of a feature of the at least one element feature vector representing the at least one candidate element is above a predetermined threshold distance from a target value; and when the value of the feature of the at least one element feature vector is above the predetermined threshold distance, modify the markup language code of the at least one candidate element to set the value of the feature of the at least one element feature vector below the predetermined threshold distance.

16. The system of claim 13, wherein the memory contains further instructions that, when executed by the processing circuitry, further configure the system to:

detect, in the at least one relevant element, at least one of:

positional attributes, textual attributes, structural attributes, visual attributes, and behavioral attributes.

17. The system of claim 13, wherein the memory contains further instructions that, when executed by the processing circuitry for identifying the at least one candidate collection of the at least one collection for web content optimization, further configure the system to:

detect when a value of a feature of the at least one collection feature vector representing the at least one candidate collection is above a predetermined threshold distance from a target value; and when the value of the feature of the at least one collection feature vector is above the predetermined threshold distance, modify the markup language code of the at least one candidate collection to set the value of the feature of the at least one collection feature vector below the predetermined threshold distance.

18. The system of claim 13, wherein the memory contains further instructions that, when executed by the processing circuitry, further configure the system to:

detect, in the at least one collection, at least one of: logical order, semantic consistency, density, visual hierarchy, functional group, and network traffic behavior.

19. The system of claim 13, wherein the memory contains further instructions which when executed by the processing circuitry further configure the system to:

receive a training dataset including a plurality of pairs of feature vectors representing at least one element and corresponding ground-truth class labels;

input the feature vectors and corresponding ground-truth class labels into the machine learning model; and train the machine learning model using the training dataset to minimize a loss function that quantifies a difference between predicted class labels and the corresponding ground-truth class labels.

20. The system of claim 19, wherein the memory contains further instructions which when executed by the processing circuitry further configure the system to:

generate the training dataset using a generative AI system configured to execute an LLM.

21. The system of claim 13, wherein the memory contains further instructions which when executed by the processing circuitry further configure the system to:

receive a dataset comprising a plurality of unlabeled feature vectors, each feature vector representing at least one element;

input the feature vectors into an unsupervised machine learning model; and train the unsupervised machine learning model on the dataset to detect latent structures or groupings among the feature vectors based on a measure of feature similarity among the feature vectors.

22. The system of claim 13, wherein the memory contains further instructions which when executed by the processing circuitry further configure the system to:

generate a prompt for a large language model (LLM) of a generative AI system, the prompt generated based on at least a predetermined template and the markup language code of the at least one candidate element; and process the generated prompt utilizing the LLM to generate the markup language code of the at least one web-optimized element.

23. The system of claim 13, wherein the contents of a web page include a Document Object Model (DOM) of the web page.

* * * * *